No. 856,950. PATENTED JUNE 11, 1907.
A. K. GILLESPIE.
CHEESE CUTTER.
APPLICATION FILED APR. 2, 1907.
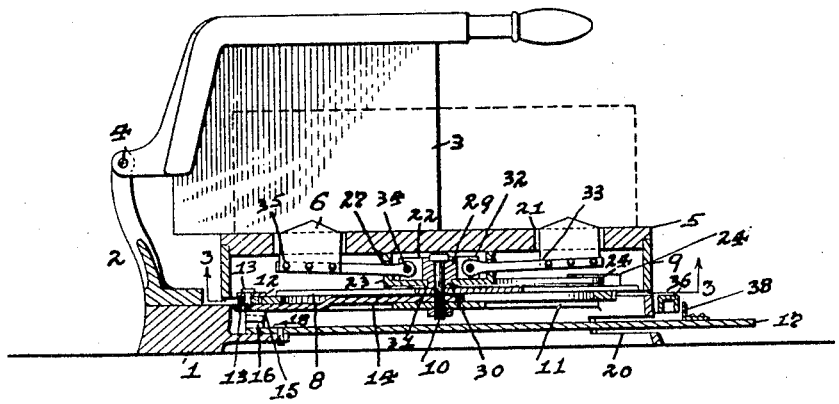
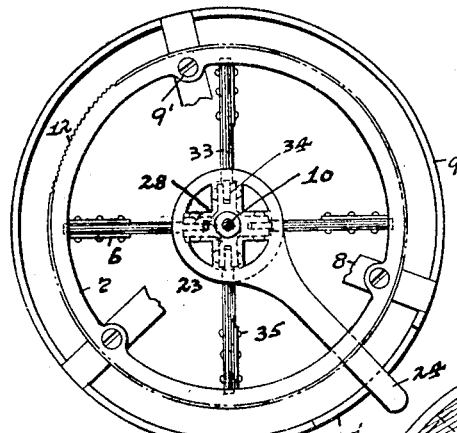
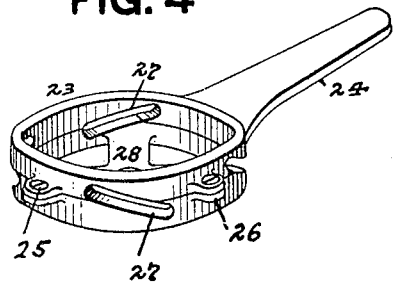
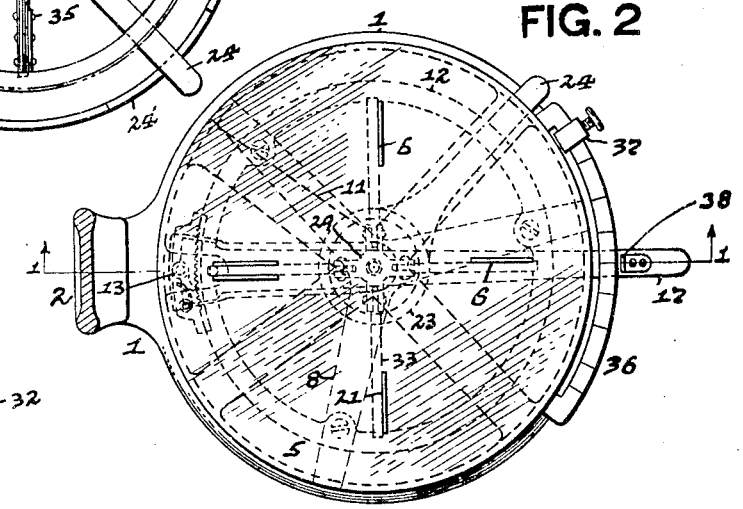
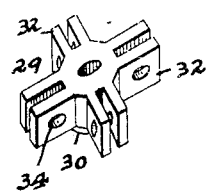
WITNESSES.
James L. Wehrn.
O. L. Thompson.
INVENTOR.
Alan K. Gillespie
By J. N. Cooke
Attorney.

UNITED STATES PATENT OFFICE.

ALAN K. GILLESPIE, OF PITTSBURG, PENNSYLVANIA.

CHEESE-CUTTER.

No. 856,950.  Specification of Letters Patent.  Patented June 11, 1907.

Application filed April 2, 1907. Serial No. 365,916.

*To all whom it may concern:*

Be it known that I, ALAN K. GILLESPIE, a resident of Pittsburg, in the county of Allegheny and State of Pennsylvania, have invented a new and useful Improvement in Cheese-Cutters; and I do hereby declare the following to be a full, clear, and exact description thereof.

My invention relates to cheese cutters and has special reference to that class of cutters shown in United States Letters Patent No. 828,105 granted to me on August 7, 1906, wherein is shown, described and broadly claimed devices for enabling the radial spurs or knives to be held below the surface of the table or board at the time of placing the cheese in position upon said surface, so that such cheese can be quickly placed in a central position on said board and the said knives greatly facilitated in entering said cheese for the holding of the same.

The object of the present invention is to provide a cheese cutter in which the devices for raising and lowering the spurs or knives are greatly cheapened and simplified, will be capable of easier and better operation, and will not get out of order or be liable to breakage.

My invention consists, generally stated, in the novel arrangement, construction and combination of parts, as hereinafter more specifically set forth and described and particularly pointed out in the claims.

To enable others skilled in the art to which my invention appertains to construct and use my invention, I will describe the same more fully, referring to the accompanying drawing, in which—

Figure 1 is a vertical central section through the cutter on the line 1—1 Fig. 2 and looking in the direction of the arrows. Fig. 2 is a top view of the same with the cutting knife removed. Fig. 3 is a bottom view showing some of the parts broken away or removed and on the line 3—3 Fig. 1 looking in the direction of the arrows. Fig. 4 is a perspective view of the device for operating the spurs or knives. Fig. 5 is a like view of the device for supporting the spurs or knives.

Like symbols of reference herein indicate like parts in each of the figures of the drawing.

In my improved cheese cutter 1 represents the main frame or ring base of the same, which carries from one side a bracket 2, having a cutting-knife 3, pivoted at 4 to the upper end thereof and being adapted when pressed down to cut radial slices from any body of cheese placed upon the supporting board 5. Projecting above the board 5 are the spurs or holding knives 6 which engage into the cheese and hold the same upon the board 5, and the said board and knives have a rotary motion imparted to the same by means of a ring 7, supported on and carried by the spider frame or bars 8 through the screw-bolts 9'. These bars 8 are connected to and extend inwardly from an intermediate rotary collar or ring 9 which is connected to the board 5 and extends down from the same adjacent to the upper edge of the base 1, while such bars are centered around a center pin 10 which is located at the center of the spider frame or bars 11 extending inwardly from the said base. The ring 7 has teeth 12 on its periphery which are engaged by a spring operated pawl 13 mounted on an arm 14 which is centered on the pin 10 and such arm is provided with a rack 15 thereon for being engaged by a like rack 16 formed on the end of a handle lever 17 which is pivoted at 18 to a projection 19 extending inwardly from the base 1 and passes through a slot 20 in said base.

The spurs or holding knives 6 are adapted to fit within slots 21 formed in the board 5 and within the collar or ring 9 is the raising and lowering device 22 for said knives which is formed of the sectional cam ring 23 having the lever 24 extending out from the lower section thereof and passing through a slot 24' in the ring 9. The cam ring 23 is made in two sections which are connected together by bolts or pins 25 passing through lugs 26 on said sections and within said ring and between the sections thereof a series of inclined ways or slots 27 are formed. The cam ring 23 fits loosely around the center pin 10 through the spider frame 28 on the lower section thereof and within said ring is the knife supporting block 29 which is centered on said pin and has a projection 30 thereon passing through a hole 31 in the frame 28 and fitting around said pin. This block 29 has a series of lugs 32 extending out from the same and between these lugs the ends of the rods 33 are pivoted, as at 34, while at the opposite ends of said rods the spurs or holding knives 6 are secured by the bolts or rivets 35.

The use and operation of my improved cheese cutter is as follows—on getting the parts ready for placing a cheese upon such a type of cutter the spurs or holding knives 6 are drawn down within the slots 21 in the board 5 by moving the lever 24 in the proper direction, so that the inner ends of the knife rods 33 will pass down the inclined slots 27 in the cam ring 23 as said ring is revolved by said lever. The cheese can now be placed in position upon the board 5 and by moving the lever 24 in the reverse direction from that above described the inner ends of the rods 33 are passed up the inclined slots 27 in the ring 3 as said ring is revolved by said lever so that the knives 6 will be raised thereby and enter the cheese by an upward and slanting movement toward the center and supporting the same in position. With the cheese thus in position when it is desired to cut slices from the body of the same the cutting knife 3 is drawn down from the frame 2 and radial slices are thus cut therefrom by moving the table or board 5 for the required distance through throwing the lever 17 in the proper direction which through the racks 15 and 16 engaging with each other and the pinion 13 meshing with the teeth 12 on the ring 7 revolves the board to measure the slice required. In consequence of equal movements of such lever 17 for operating the board 5, equal-sized slices of cheese are produced throughout the circle of the same and the knives 6 in moving around with said board and being adapted to be raised and lowered within the said board to properly center the cheese will enable this to be accomplished. The size of slices to be cut from the cheese is regulated or gaged by a scale 36 at the front of the cutter and carried by the base 1, which scale is provided with an adjustable stop 37 for engaging with the lever 17 in its movement of turning the board 5 and a pointer 38 is placed upon said lever for use with said scale in determining the proportionate parts of a cut.

It will be evident that as in my hereinbefore mentioned patent the ring attached to the board is only used to confine the operating parts of the cutter and that such ring may be formed as part of said board by depending therefrom, while various other modifications and changes in the construction, design and operation of the various parts of my improved cutter may be resorted to without departing from the spirit of the invention or sacrificing any of its advantages. It will thus be seen that my improved cheese cutter is composed of strong and durable parts for the purpose for which it is intended and will be quick and positive in its operation and as to work performed. It is easily operated and will enable the cheese to be accurately centered for the cutting of the slices from the same in the required amounts, while at the same time few and simple parts are added over the ordinary class of these cutters, and it is not liable to need repairing through getting out of order at any time.

What I claim as my invention and desire to secure by Letters Patent is—

1. In a cheese cutter, the combination of a base, a rotary table, spurs or holding knives, and a cam mechanism connected to said knives for raising and lowering the same within the table.

2. In a cheese cutter, the combination of a base, a rotary table, spurs or holding knives, and a cam mechanism under said table connected to said knives for raising and lowering the same within the table.

3. In a cheese cutter, the combination of a base, a rotary table, spurs or holding knives, and inclined ways under said table for raising and lowering the knives within the table.

4. In a cheese cutter, the combination of a base, a rotary table, spurs or holding knives, and a movable ring under said table having inclined ways for raising and lowering the knives within the table.

5. In a cheese cutter, the combination of a base, a rotary table, spurs or holding knives having rods connected thereto, and a movable ring under said table having inclined ways for engaging with said rods to raise and lower the same within the table.

6. In a cheese cutter, the combination of a base, a rotary table, spurs or holding knives, rods connected to said knives and to a supporting block, and a movable ring under said table having inclined ways for engaging with said rods to raise and lower the same within the table.

7. In a cheese cutter, the combination of a base, a rotary table, spurs or holding knives, rods connected to said knives and pivoted on a supporting block, and a movable ring under said table and around said block having inclined ways for engaging with said rods to raise and lower the same within the table.

8. In a cheese cutter, the combination of a base, a rotary table, a collar carried by said table having a slot therein, spurs or holding knives, rods connected to said knives and pivoted on a supporting block, a movable ring under said table and around said block having inclined ways for engaging with said rods to raise and lower the same within the table, and a lever connected to said ring and extending through said slot for moving said ring.

9. In a cheese cutter, the combination of a base, a rotary table, and a series of spurs or holding knives adapted to be raised and lowered within the table by a slanting movement.

10. In a cheese cutter, the combination of a base, a rotary table, a series of spurs or holding knives, and means connected to said knives for raising and lowering the same within the table by a slanting movement.

11. In a cheese cutter, the combination of a base, a rotary table, spurs or holding knives, and a cam mechanism connected to said knives for raising and lowering the same within the table by a slanting movement.

12. In a cheese cutter, the combination of a base, a rotary table, spurs or holding knives, and a cam mechanism under said table connected to said knives for raising and lowering the same within the table by a slanting movement.

13. In a cheese cutter, the combination of a base, a rotary table, spurs or holding knives, and inclined ways under said table for raising and lowering the knives within the table by a slanting movement.

14. In a cheese cutter, the combination of a base, a rotary table, spurs or holding knives, and a movable ring under said table having inclined ways for raising and lowering the knives within the table by a slanting movement.

15. In a cheese cutter, the combination of a base, a rotary table, spurs or holding knives having rods connected thereto, and a movable ring under said table having inclined ways for engaging with said rods to raise and lower the same within the table by a slanting movement.

16. In a cheese cutter, the combination of a base, a rotary table, spurs or holding knives, rods connected to said knives and to a supporting block, and a movable ring under said table having inclined ways for engaging with said rods to raise and lower the same within the table by a slanting movement.

17. In a cheese cutter, the combination of a base, a rotary table, spurs or holding knives, rods connected to said knives and pivoted on a supporting block, and a movable ring under said table and around said block having inclined ways for engaging with said rods to raise and lower the same within the table by a slanting movement.

18. In a cheese cutter, the combination of a base, a rotary table, a collar carried by said table having a slot therein, spurs or holding knives, rods connected to said knives and pivoted on a supporting block, a movable ring under said table and around said block having inclined ways for engaging with said rods to raise and lower the same within the table by a slanting movement, and a lever connected to said ring and extending through said slot for moving said ring.

In testimony whereof, I the said ALAN K. GILLESPIE have hereunto set my hand.

ALAN K. GILLESPIE.

Witnesses:
A. B. ANGNEY,
J. N. COOKE.